United States Patent Office 3,474,496
Patented Oct. 28, 1969

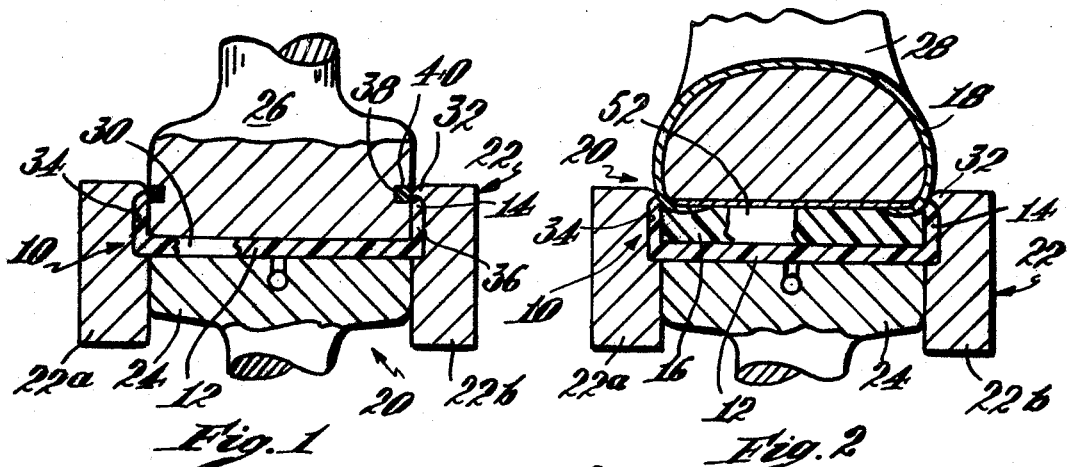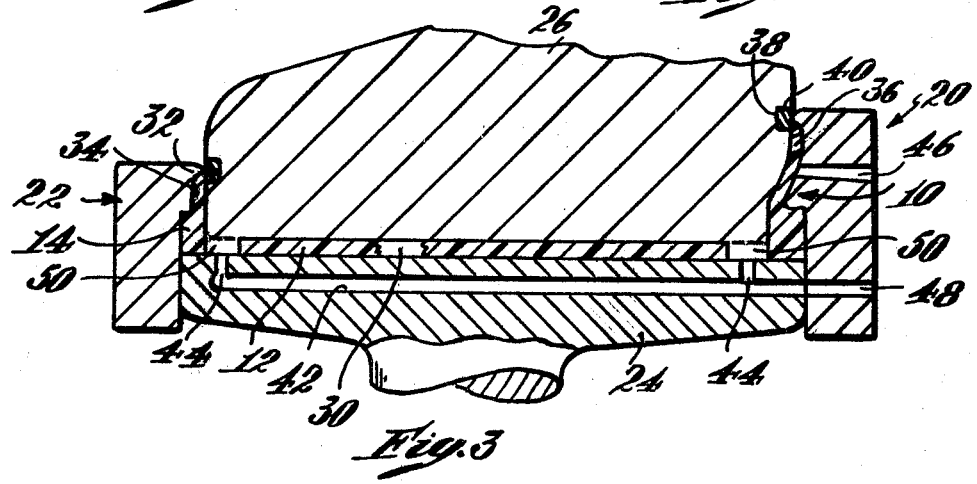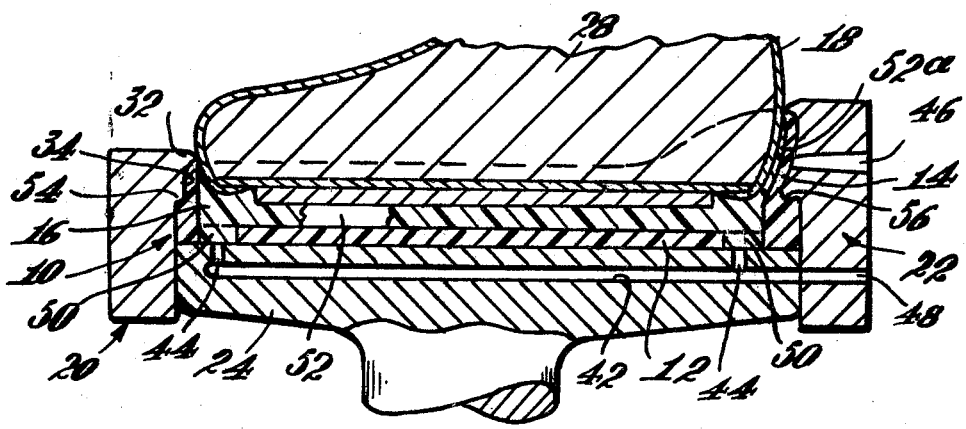

3,474,496
APPARATUS FOR MAKING SHOES BY
INJECTION MOLDING
Werner Klee, Parkweg, Germany, assignor to Desma-
Werke Gesellschaft mit beschrankter Haftung, Bremen,
Germany
Filed Aug. 15, 1967, Ser. No. 660,692
Claims priority, application Germany, Nov. 19, 1966,
D 51,589; Dec. 23, 1966, D 51,857
Int. Cl. B29d 3/00
U.S. Cl. 18—36                                    18 Claims

ABSTRACT OF THE DISCLOSURE

A mold assembly for making multi-ply shoe bottoms by molding of a suitable bottom-forming material comprising an open top mold and parts alternately useable therewith to form a composite bottom comprised of outer and inner layers and of attaching the composite bottom to the bottom of a lasted upper.

Background of the invention

It is not new to make multi-ply bottoms for shoes; however, such methods and molding apparatus as are available do not lend themselves to making a bottom having a one-piece outer layer comprising a tread portion and an edge strip and an interior cushion layer. Accordingly, it is the purpose of this invention to provide an apparatus for forming a bottom with a tread portion and edge strip in one piece and an interior cushion layer.

Summary

The apparatus comprises a mold assembly comprising an open top mold and first and second parts, the first part being adapted to be inserted through the open top of the mold into the mold cavity and to provide in conjunction therewith a closed cavity having a bottom and peripheral wall for receiving and forming an outer layer comprising the shell and said second part being adapted after the first part is removed to cover the open top of the mold or to support an upper in engagement with the open top of the mold adjacent the upper edge of the shell to form a cavity between the bottom of the upper and the interior of the shell for receiving and forming the inner cushion layer which completes the bottom and/or attaches the same to the upper. The mold comprises a ring and sole plate movable therein which collectively form a mold cavity of variable depth and preferably the ring is split longitudinally to enable separation of the component halves. The first part comprises a core and is shaped to enter the open top of the mold cavity and may have on its lower surface one or more dams engageable with the bottom of the mold cavity. A sealing ring is mounted on the first part for engagement with the rim of the mold when inserted into the mold cavity to seal the entrance of the first part in the mold cavity. The mold comprising the ring and sole plate are provided with injection openings through which bottom-forming composition may be injected into the mold cavity and these are arranged in the sole plate and ring to permit injection to form the outer layer first and thereafter to form the inner layer within the outer layer. Optionally, the first part may embody an inflatable diaphragm movable into the mold cavity and thereafter inflated to conform the bottom-forming material therein to the interior of the mold cavity.

The invention will now be described in greater detail with reference to the accompanying drawings wherein:

FIG. 1 is an elevation, partly in section, taken transversely of a mold assembly comprising a ring, sole plate and core part inserted into the mold cavity provided by the ring and sole plate in a position for forming the outer layer of the bottom;

FIG. 2 is an elevation, partly in section, taken transversely of the mold assembly with a last substituted for the core part supporting a lasted upper adjacent the rim of the mold cavity for injection of the inner cushion layer of the bottom;

FIG. 3 is an elevation, partly in section, taken longitudinally of the mold assembly illustrated in FIG. 1;

FIG. 4 is an elevation, partly in section, taken longitudinally of the mold assembly as shown in FIG. 2;

Figure 5:
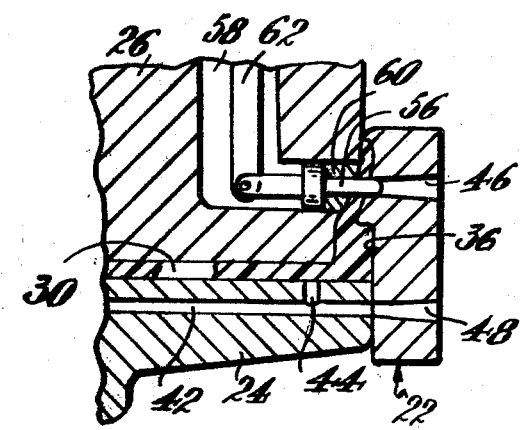
FIG. 5 is a fragmentary vertical section at the heel end of the mold assembly showing a valve associated with the injection opening in the ring.

The invention is concerned with the manufacture of multi-layer shoe bottoms and especially to forming a bottom by molding in which the outer layer 10 of the bottom comprises a tread portion 12 and a peripheral edge strip 14 extending upwardly therefrom and the inner layer 16 comprises a cushion which fills the cavity within the outer layer and optionally attaches the composite bottom to the bottom of a lasted upper 18. The upper to which the bottom is attached may be comprised of any suitable material, may embody an insole and/or filler or may be string-lasted. Where desirable the lasting margin of the upper may be roughened and/or otherwise treated, for example, by application of an adhesive to enhance the bond between it and the bottom to be attached thereto.

The outer layer 10, which is in the form of a shell, is preferably comprised of a dense material, for example, polyvinyl chloride, and the inner cushion layer 16 is preferably comprised of a cellular material, for example, expanded polyurethane. The denser outer layer 10 provides good durability and the inner cushion layer 16 of expanded material provides for light weight and foot comfort. The inherently poor surface structure of the inner cushion layer 16 is protected by the dense outer layer 10 which provides a durable, smooth, attractive outer surface.

The mold assembly, by means of which the multi-layer bottoms are formed and attached to lasted uppers comprise, as shown in FIGS. 1 to 4, a mold 20 embodying a ring 22 and sole plate 24 movable therein which collectively form an interior mold cavity of variable depth and first and second parts 26 and 28 alternately useable within the mold. The ring 22 is split longitudinally so that the two halves 22a and 22b of which it is comprised may be separated to enable removing a finished shoe. The part 26 has a cross-section corresponding substantially to the area of the open top of the mold so that it can be moved through the open top into the mold cavity, as shown in FIG. 1, to dispose its lower surface at a predetermined distance above the upper surface of the sole plate to provide a space 30 between the part 26 and the sole plate 24 corresponding to the thickness of the tread portion of the outer layer 12. The open top of the mold has peripherally thereof a lip 32 and below the lip there is a reentrant groove 34 so that when the part 26 is inserted into the mold cavity there is a space 36 between the interior of the mold cavity and the outer side of the part 26 which corresponds in thickness to the edge strip 14. The spaces 30 and 36 collectively provide a closed mold cavity such as to form, when filled with a suitable bottom-forming composition, the outer shell-like layer of the bottom. To provide a seal where the part 26 enters the mold cavity the part 26 contains a peripheral groove 38 in which there is seated a gasket member 40 so that when the part is inserted into the mold cavity the gasket will yieldably engage the lip.

The sole plate 24 is provided with a longitudinal passage 42 below its upper surface and substantially parallel thereto which is connected to the interior of the mold cavity by passages 44 extending upwardly therefrom through the surface, and the ring is provided with two passages 46 and 48. When the part 26 is inserted into the mold cavity for the purpose of forming the outer layer the passage 46 is in communication with the space 36 between the inner surface of the mold cavity and the outer surface of the part 26 and the passage 48 is in communication with the passage 42.

As illustrated, the bottom of the part 26, as shown in FIG. 3, has on its lower surface dams 50 which project downwardly therefrom an amount corresponding to the thickness of the tread portion of the outer layer 12 to be formed and are so located that they cover the upper open ends of the passages 44. Hence when the bottom-forming composition is injected through the opening 46 it will fill the spaces 36 and 30 to form a shell, the bottom of which constitutes the tread portion of the bottom to be formed and the wall of which constitutes an edge strip integral therewith. The bottom-forming composition, however, is excluded from the areas where the dams 50 are located.

Following formation of the outer layer the part 26 is removed and the part 28 which has a shape corresponding to a conventional last with an upper 18 mounted thereon is placed in engagement with the lip of the mold, as shown in FIG. 2, whereupon a second injection is made through the passages 48, 42 and 44 and through the openings in the tread portion of the outer layer left by withdrawal of the dams 50 therefrom into a space 52 between the lower side of the upper and the interior of the shell. The second injection as related above is, for example, an unexpanded material containing an activatable material which upon activation produces an expanded structure interiorly of the shell. This inner expanded layer unites the outer shell layer to the last and provides a cushion-like interior for the bottom. Optionally, the material in an already expanded condition may be injected into the space 52.

The lateral surface of the part 26 may be either straight or slightly tapered to permit easy withdrawal from the mold cavity after the first injection has been made. The lateral surface of the last 28 is preferably tapered sufficiently more than the part 26 so as to provide between the inner side of the edge strip which projects upwardly about the lower part of the lasted upper a narrow, upwardly tapering space 52a (FIG. 4) peripherally of the surface of the upper when the latter is placed in engagement with the open top of the mold and so that some of the cushion-forming material flows upwardly between the outer surface of the upper and the inner surface of the edge strip to enhance the bond between the two.

It is within the scope of the invention to shape the inner surface of the ring to provide for a perfectly plain outer surface or to provide at the outer surface shoulders 54 and 56 (FIG. 4) at the toe and heel respectively, suitable for receiving ski bindings. When forming a bottom with the aforesaid shoulders for receiving ski binding it is especially important to taper the bottom part of the last to provide a space between the surface of the upper and the inner side of the edge strip for receiving flow of the cushion-forming material between the outer surface of the upper and the inner surface of the edge strip in sufficient amount to form a strong bond.

As previously indicated, the shell comprising the tread and edge strip are preferably comprised of polyvinyl chloride which is tough and wear-resistant and the cushion layer is formed of a foamed material to provide for foot comfort and light weight. If desired, the cushion material may be injected prior to foaming and allowed to expand within the shell between the lower surface of the upper and the interior of the shell. The expansion of the cushion material and the ultimate shape of the bottom can be controlled by manipulation of the sole plate within the ring during foaming and setting. Optionally, a non-foaming and poreless material may be used for the inner layer, for example, a material having a lower durometer and hence a softer and more yieldable character than the material of the outer layer, or if the cushion-like character of the interior is not the criterion a cheaper material.

The use of the dams 50 at the lower side of the part 26 may be avoided as illustrated in FIG. 5 by providing a valve member in the form of a pin 56 supported in an opening 58 in the part 26 in a position to project rearwardly therefrom through a gland 60 into the passage 46 when the part is lowered into the mold cavity to make the first injection. Injection is made this time through the passages 48, 42 and 44 into the space 30 between the upper surface of the sole plate and the lower surface of the part 26 until this portion of the cavity and also the portion 36 between the interior of the ring and the outer surface of the part 26 is filled. The bottom-forming composition is excluded from the passage 46 by the pin 56. After injection the pin 56 is withdrawn by means of linkage 60, 62 whereupon the part 26 is withdrawn, the lasted upper is mounted on the rim of the mold and the second injection is made through the passage 46 and through the hole left by withdrawal of the pin 56 into the space 52 between the lower surface of the lasted upper and the interior of the shell.

Figure 8:
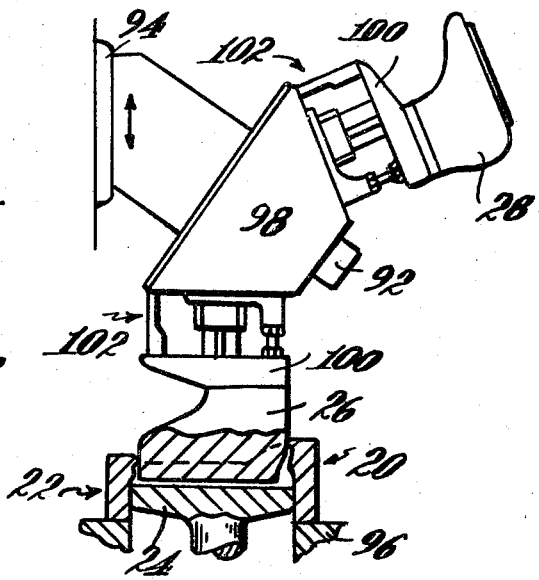
FIG. 8 is an elevation of a support for the first and second parts by means of which they may be rotated alternately into operative relation to the mold.

The two parts, those illustrated in FIGS. 1 to 4, inclusive, comprising the part 26 and the part 28 may be supported for movement alternatively into operative position in relation to the mold as shown in FIG. 8. Conveniently, the support comprises a shaft 92 supported at one end on a slide 94 for vertical movement perpendicular to the mold 20, the latter being mounted on a support 96 below it. The lower end of the inclined shaft 92 has rotatably mounted on it a hub 98 which is frusto-conical and has attached at diametrically opposed points bracket members 100 to which the respective parts are secured. The bracket members 100 are connected to the hub by adjustable means 102 to enable adjusting the parts heightwise relative to the mold. Suitable means (not shown) may be provided for raising and lowering the slide 94 to enable lifting the parts clear of the mold for rotation of the part adjacent the mold to an out of the way position and at the same time to bring the other part into a position of adjacency above the mold and then lower it into engagement therewith.

Figure 6:
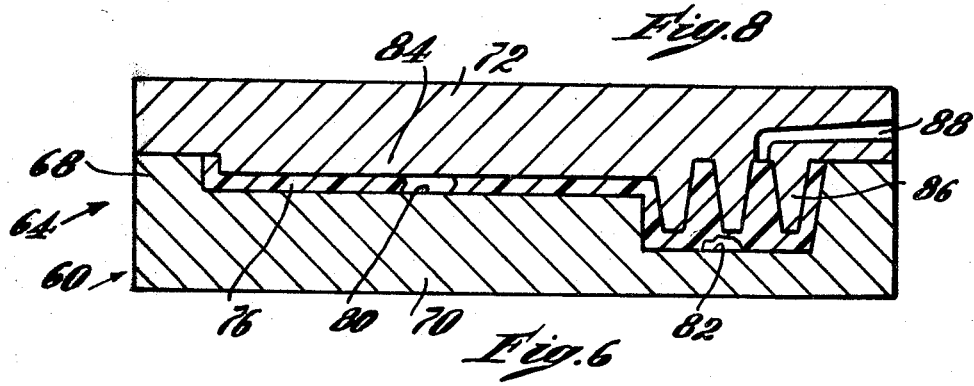
FIG. 6 is a vertical section taken longitudinally of a mold assembly comprising a mold having a fixed bottom and a core for forming the outer layer of an unattached bottom.
Figure 7:
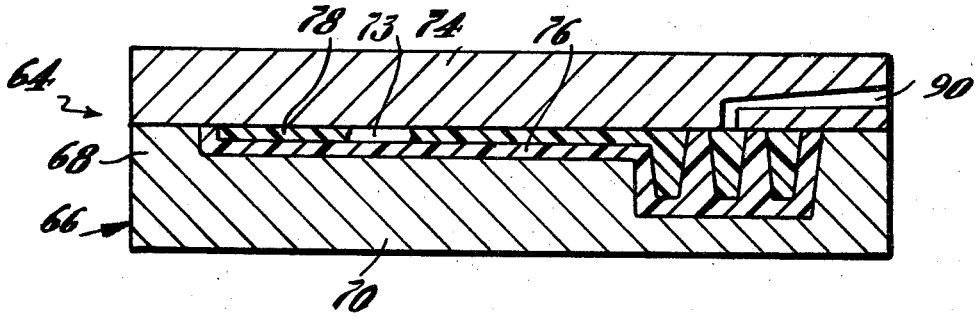
FIG. 7 is a vertical section taken longitudinally of the assembly shown in FIG. 6 with a cover substituted for the core for forming the inner cushion layer when making an unattached bottom.

The method and apparatus described thus far relate to forming and attaching a multi-ply bottom to an upper as a complete operation. However, the method and the apparatus in a slightly modified form are useful for making multi-ply bottoms which are not attached to an upper but which may later be attached to an upper. Forming the unattached bottoms by forming an outer layer embodying a tread portion and edge strip and then forming an inner or cushion layer is shown in FIGS. 6 and 7. In FIG. 6 the mold assembly 64 comprises a mold 66 embodying a ring 68 and a fixed bottom 70 which collectively provide an open top mold cavity of fixed depth and parts 72 and 74 alternately useable therewith. The part 72 is adapted to be inserted into the mold cavity for formation of an outer layer 76 of the bottom and the form 74 is adapted to be placed across the top of the mold after the outer layer has been formed and the part 72 removed for formation of an inner cushion layer 78. In the assembly shown in FIGS. 6 and 7 the mold 66 has a forepart cavity 80 and a heel cavity 82. The part 72 is provided with a core 84 and core pins 86 adapted when the part is placed on the mold to project into the cavity at the forepart and heel end. The part 72 also contains a passage 88 through which bottom-forming composition is adapted to be injected when it is placed against the top of the mold to fill the cavities 80 and 82 with bottom-forming composition of the kind suitable for the outer layer of the bottom.

The outer layer thus formed has a tread portion, a heel portion containing a plurality of holes corresponding to the core pins and an edge strip. Following injection of the outer layer or shell the part 72 is removed and the part 74 is placed against the top of the mold. The part 74 is provided with a passage 90 through which bottom-forming composition for forming a cushion layer is adapted to be injected into the space 73 between the part 74 and the outer layer to complete the bottom. The composite bottom thus formed may be attached to the bottom of an upper in any suitable manner and will provide the advantageous characteristics of a bottom attached directly to the upper in that the outer layer comprising the tread portion and the edge strip are integral and completely contain the inner cushion layer protecting the same against wear while preserving the cushion-like comfort afforded by the expanded structure. The holes at the heel end of the outer layer which become filled with the cushion material provide for greater resilience of the heel.

Bottoms made according to the preceding description are comprised of a bottom-forming composition which has been rendered flowable or plastic by means of heat and pressure and injected under pressure through the passages into the mold cavity to form the first and second layers, the first layer being formed first and allowed to set prior to injection of the second layer.

A comparable bottom may be formed by using a sheet of flexible, dense, wear-resistant material such as polyvinyl chloride or the like as the outer layer. The sheet material is placed across the open top of the mold cavity and formed to the interior surface thereof by inserting a core part into the mold cavity. After the sheet material is formed to the interior of the mold cavity the core part is withdrawn, the bottom of a lasted upper supported on a last is placed across the open top of the mold cavity and bottom-forming composition is injected into the space between the lower surface of the upper and the interior of the shell comprised of the previously formed sheet material. A formable bottom-forming composition such as used in making the inner cushion layer of the bottoms, illustrated in FIGS. 1 to 5, inclusive, may be employed. For a mold cavity having straight sides a rigid core part may be employed to force the sheet material into the mold cavity and by application of heat and pressure the sheet material can be caused to conform to the interior of the cavity and to retain its shape following withdrawal of the core part. To set the sheet material in the form imparted to it the sole plate and/or the core part may be heated.

Figure 9:
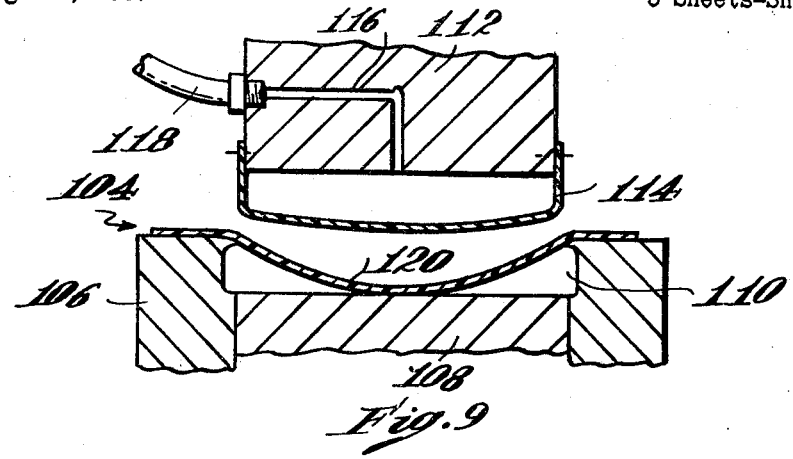
FIG. 9 is an elevation, in section, taken transversely of a mold assembly in which the core is provided with an inflatable diaphragm for entrance into the mold cavity to conform a formable material to the interior of the mold cavity.
Figure 10:
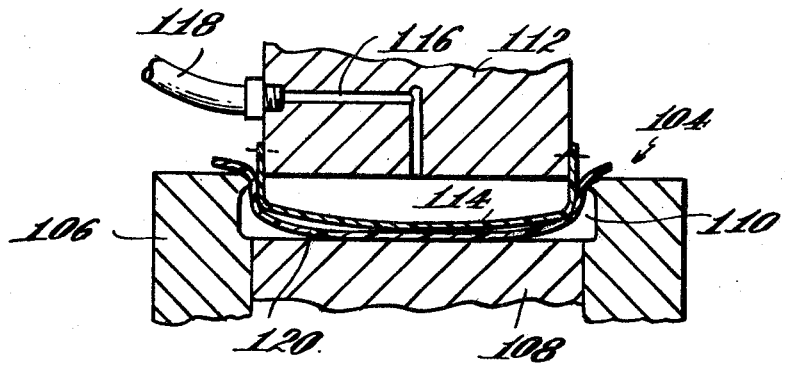
FIG. 10 is a corresponding view showing the first part lowered into the mold cavity.
Figure 11:
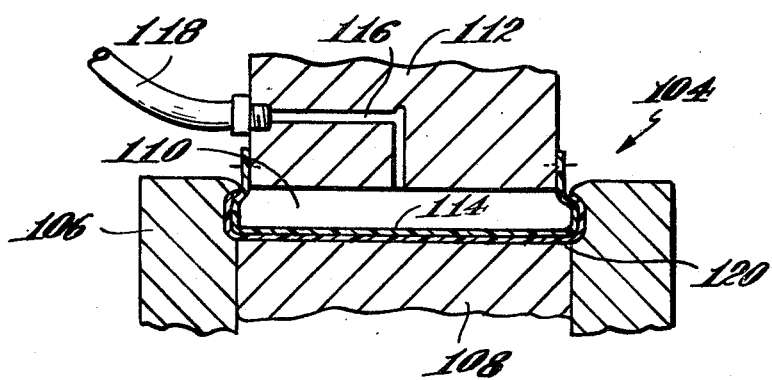
FIG. 11 is a corresponding view showing the inflatable diaphragm inflated so as to conform the formable material to the interior of the mold cavity.

FIGS. 9, 10 and 11 illustrate a mold assembly for use when the interior of the mold cavity is re-entrant comprising a mold 104 embodying a ring 106 and sole plate 108 movable therein to provide a mold cavity 110 of variable depth and a core part 112. The core part 112 is adapted to be inserted into the open top of the mold cavity and has secured to it an inflatable diaphragm 114. A passage 116 in the core part connected to a flexible conductor 118 provides for supplying air pressure to the interior of the diaphragm 114 to inflate it.

A sheet of suitable material such as polyvinyl chloride 120 is placed across the open top of the mold cavity 110 as shown in FIG. 9, the core part 112 is lowered into the mold cavity (FIG. 10) to depress the sheet 120 into the mold cavity and then the diaphragm is inflated as shown in FIG. 11 to conform the sheet to the interior surface of the mold cavity to form a shell embodying a tread portion and an edge strip. Following conformation of the sheet to the interior of the mold cavity the diaphragm is deflated and the core part 112 is withdrawn. To cause the sheet material to retain the shell-like shape imparted to it after withdrawal of the core part heat is desirably employed either by heating the sole plate or by supplying steam or hot air to inflate the diaphragm. Upon withdrawal of the core part an upper mounted on a last is placed upon the open top of the mold against the lip and cushion-forming composition is injected into the mold cavity into the space between the bottom of the upper and the interior of the outer layer to join the latter to the upper.

The ring 106 is preferably split longitudinally to enable removing the finished shoe and the sole plate 108 is movable vertically within the ring to enable controlling the dimensions of the bottom.

The bottom thus formed embodies the benefits of the previously described bottom in that it has an outer layer including a tread and edge strip which are integral and which is comprised of a dense, wear-resistant and an inner cushion layer which provides foot comfort.

It should be understood that the present disclosure is for the purpose of illustration only and that this invention includes all modifications and equivalents which fall within the scope of the appended claims.

I claim:

1. A mold assembly comprising an open top mold providing a cavity having a rim peripherally thereof and parts alternately useable therewith comprising a first part embodying a core adapted to be positioned within the cavity, said part and core providing in conjunction with the interior of the mold cavity a closed space having a bottom and side wall adapted to receive a moldable material to form within the space a shell-like outer part of a composite shoe bottom, and a second part adapted to be placed above the open top of the mold cavity when the first part is withdrawn to close the same and form with the interior of the shell-like outer part a closed space adapted to receive a moldable material to form within the shell-like outer part an inner part of the composite shoe bottom.

2. A mold assembly for molding multi-ply shoe bottoms comprising an open top mold providing a mold cavity having a rim peripherally thereof, and first and second parts alternately co-operable therewith; said first part being adapted to be inserted into the mold cavity through the open top with a clearance below the rim between the interior of the mold cavity and the surface of the first part which provides a closed space having a bottom and side wall, said space being adapted to be filled by a first injection of bottom-forming composition to form a shell-like outer layer of the bottom and said second part being adapted to be placed in engagement with the rim of the mold cavity after withdrawal of the first part to provide a closed space between it and the interior of said shell-like outer layer, said latter space being adapted to receive a second injection of bottom-forming composition to form an inner layer of the bottom.

3. A mold assembly for forming a bottom to an upper comprising an open top mold providing a mold cavity having a lip peripherally thereof, and first and second parts alternately co-operable therewith; said first part being adapted to fit into the mold cavity through the open top to a position spaced from the bottom of the cavity to provide a bottom cavity of predetermined depth, said mold having below its lip a re-entrant groove which provides in conjunction with the peripheral surface of said first part in said position a side cavity surrounding said first part, said bottom and said side cavities being adapted to receive a first injection of bottom-forming composition to form a shell-like outer layer of the bottom, and said second part being adapted to support a lasted upper in engagement with the lip of the mold cavity following withdrawal of the first part to provide a cavity between the bottom of the lasted upper and the interior of said shell-like outer layer, said last-named cavity being adapted to receive a second injection of bottom-forming composition to form an inner layer of the bottom.

4. A mold assembly according to claim 3, wherein the first part is supported for movement relative to the bottom of the mold cavity to enable varying the depth of the bottom cavity.

5. A mold assembly according to claim 3, wherein the mold embodies a movable sole plate movable to vary the depth of the mold cavity.

6. A mold assembly according to claim 3, wherein the mold comprises a side ring and a sole plate, said sole plate being movable relative to said side ring to vary the depth of the mold cavity, and said side ring being comprised of parts separable longitudinally of the cavity.

7. A mold assembly according to claim 3, wherein the mold has side and bottom openings through which the first and second injections are made, and means for alternately blocking the openings such that the first injection may be made either through the side or bottom and the second injection may be made either through the bottom or side.

8. A mold assembly according to claim 3, wherein the mold has side and bottom openings and the first part has at the bottom a dam adapted to cover the bottom opening while the first injection is being made through the side opening.

9. A mold assembly according to claim 3, wherein the mold has side and bottom openings and there is a closure member mounted on the first part operable when the first part is situated in the mold cavity to block the side opening while the first injection is being made through the bottom opening, said closure being adapted to be withdrawn from the side opening when the first part is withdrawn from the cavity.

10. A mold assembly according to claim 3, comprising a support mounting the first and second parts for movement alternately to position each one adjacent the open top of the mold.

11. A mold assembly according to claim 3, comprising a shaft inclined to the open top of the mold, a carrier mounted on the shaft having diametrically opposed portions which, by rotation about said shaft, may be brought into parallel relation with the open top of the mold, and means securing the first and second parts to said portions of the carrier so that by rotation of the carrier the parts may alternately be moved into positions adjacent the open top of the mold.

12. A mold assembly according to claim 11, comprising means supporting the shaft for movement toward the mold to lower the part rotated to a position above the mold downwardly into operative engagement therewith.

13. A mold assembly according to claim 3, wherein the first part has a sealing ring peripherally thereof positioned to confront the lip of the mold when the first part is situated in the mold to form a seal between the first part and the lip of the mold.

14. A mold assembly according to claim 3, wherein the interior of the mold cavity below the lip contains recesses of different transverse width.

15. A mold assembly comprising an open top mold providing a cavity having a rim peripherally thereof, and parts alternately useable therewith comprising a first part adapted to be placed against the open top of the mold, said part embodying a core which extends into the cavity and which provides in conjunction with the interior of the mold a closed space having a bottom and side wall, said closed space being adapted to receive a moldable material to form a shell-like outer layer of a shoe bottom, and said second part comprising a cover adapted to be placed against the open top of the mold when the first part has been withdrawn to provide in conjunction with the interior of the shell-like outer layer a closed space for receiving a moldable material to form within the shell an inner layer of the shoe bottom.

16. A mold assembly comprising an open top mold providing a cavity having a rim peripherally thereof, and parts alternately useable therewith comprising a first part embodying an inflatable diaphragm, said first part being adapted to be positioned within the mold cavity and said inflatable part being adapted to be inflated within the mold cavity to conform moldable material in the cavity to the interior shape of the cavity, and a second part adapted to be placed above the open top of the mold when the first part is withdrawn to close the same and form with the interior of the shell-like outer part a closed cavity adapted to receive a moldable material to form within the shell an inner layer of a shoe bottom.

17. A mold assembly comprising an open top mold providing a cavity having a rim peripherally thereof, and parts alternately useable therewith comprising a first part embodying a core shaped to pass through the opening defined by the lip to a position close to but spaced from the bottom, said core interiorly of the lip being of smaller section than the interior of the cavity so as to provide a space peripherally of the core which in conjunction with the space at the bottom provides a cavity having a bottom and side wall, said cavity being adapted to receive a moldable material to form a shell-like outer layer of the bottom, said core having a tapered side surface to permit withdrawal from the mold cavity following formation of the shell-like outer layer, and mounting a sealing ring for engagement with the lip of the mold cavity during injection to prevent leakage, and a second part comprising a last on which an upper is lasted adapted to be placed on the top of the mold to hold the bottom of the lasted upper adjacent the open top of the shell-like outer layer and to form with the interior thereof a space for receiving a moldable material to form an inner layer, said last having a slightly greater taper at the bottom than the core so that the side surface thereof is spaced from the interior of the shell and provides an extension of the space between the bottom of the upper and the shell for receiving moldable material.

18. A mold assembly for forming shoe bottoms comprising an open top mold providing a cavity for receiving a moldable material, and first and second parts alternately cooperable therewith comprising a core adapted to be inserted through the open top of the mold into the cavity, said core embodying an inflatable diaphragm adapted to be inflated within the mold cavity to conform moldable material therein to the interior of the cavity to form an outer shell having a bottom and peripheral wall, and a last adapted to be placed against the open top of the mold to hold lasted upper adjacent the open top of the preformed shell for injection of moldable material into the cavity between the two to join them.

References Cited
UNITED STATES PATENTS
3,031,722  5/1962  Gits _____ 264—246
3,343,223  9/1967  Ludwig _____ 18—42
3,400,429  9/1968  Ludwig _____ 18—30

FOREIGN PATENTS
40,603  8/1965  Germany.

WILBUR L. McBAY, Primary Examiner

U.S. Cl. X.R.

18—30, 34, 42; 264—244, 255, 328